US011204490B2

(12) United States Patent
Levecq et al.

(10) Patent No.: US 11,204,490 B2
(45) Date of Patent: Dec. 21, 2021

(54) DYNAMIC FOCUSING SYSTEM FOR AN OPTICAL DEVICE

(71) Applicant: DAMAE MEDICAL, Orsay (FR)

(72) Inventors: Olivier Levecq, Paris (FR); David Siret, Vincennes (FR)

(73) Assignee: DAMAE MEDICAL, Orsay (FR)

( * ) Notice: Subject to any disclaimer, the term of this patent is extended or adjusted under 35 U.S.C. 154(b) by 8 days.

(21) Appl. No.: 16/960,406

(22) PCT Filed: Jan. 11, 2019

(86) PCT No.: PCT/EP2019/050669
§ 371 (c)(1),
(2) Date: Jul. 7, 2020

(87) PCT Pub. No.: WO2019/138062
PCT Pub. Date: Jul. 18, 2019

(65) Prior Publication Data
US 2020/0341257 A1 Oct. 29, 2020

(30) Foreign Application Priority Data

Jan. 12, 2018 (EP) ...................................... 8305025

(51) Int. Cl.
*G02B 21/24* (2006.01)
*G02B 21/00* (2006.01)
(Continued)

(52) U.S. Cl.
CPC ....... *G02B 21/245* (2013.01); *G02B 21/0056* (2013.01); *G02B 21/33* (2013.01); *G01B 9/02091* (2013.01)

(58) Field of Classification Search
None
See application file for complete search history.

(56) References Cited

U.S. PATENT DOCUMENTS 6,485,413 B1    11/2002   Boppart et al.
2006/0141613 A1  6/2006   Tsuchiya et al.
                (Continued)

FOREIGN PATENT DOCUMENTS

DE    202 05 080 U1    6/2002
EP    3 018 518 A1     5/2016
                (Continued)

OTHER PUBLICATIONS

International Search Report and Written Opinion of the International Searching Authority dated Apr. 18, 2019 in corresponding International application No. PCT/EP2019/050669; 11 pages.

*Primary Examiner* — Derek S. Chapel
(74) *Attorney, Agent, or Firm* — Maier & Maier, PLLC

(57) ABSTRACT

A dynamic focusing system (DFS) for an optical device for observing an object. The dynamic focusing system (DFS) has an objective housing (OBH) including a circumferential housing part (CIH) and a light-transmitting window (LTW); a chamber (ICH) filled with an immersion medium having a refractive index substantially equal to the refractive index of the object to be observed; a movable immersed objective (MIO) configured to move along at least one direction so as to vary the focusing depth and being at least partially immersed in the immersion medium. The immersion medium is confined in the chamber (ICH) by a deformable sealing member (DSM) attached to the movable immersed objective (MIO) and to the objective housing (OBH). The deformable sealing member (DSM) is configured to ensure that the volume of the chamber (ICH) remains substantially constant upon displacement of the movable immersed objective (MIO) relative to the objective housing (OBH).

21 Claims, 7 Drawing Sheets

(51) Int. Cl.
*G02B 21/33* (2006.01)
*G01B 9/02* (2006.01)

(56) References Cited

U.S. PATENT DOCUMENTS

| | | | |
|---|---|---|---|
| 2008/0180688 A1* | 7/2008 | Mengel | G03F 7/70716 |
| | | | 356/515 |
| 2008/0246972 A1 | 10/2008 | Dubois et al. | |
| 2009/0021726 A1* | 1/2009 | Wegmann | G03F 7/2041 |
| | | | 356/124 |
| 2009/0133170 A1 | 5/2009 | Rolland et al. | |
| 2009/0147373 A1 | 6/2009 | Rolland et al. | |
| 2010/0110540 A1 | 5/2010 | Niv et al. | |
| 2013/0044370 A1 | 2/2013 | Seyfried et al. | |
| 2016/0259162 A1* | 9/2016 | Takechi | G02B 21/02 |
| 2016/0320598 A1 | 11/2016 | Dubois | |

FOREIGN PATENT DOCUMENTS

| | | |
|---|---|---|
| FR | 2 584 829 A1 | 1/1987 |
| FR | 3015659 A1 | 6/2015 |
| WO | 2007/017589 A1 | 2/2007 |

\* cited by examiner

DYNAMIC FOCUSING SYSTEM FOR AN OPTICAL DEVICE

FIELD

The invention relates to the field of optical devices and methods, intended in particular, but not exclusively, for biological and medical purposes. In particular, the invention relates to a dynamic focusing system for an optical device and a portable optical apparatus for optical imaging, intended in particular for biological and medical applications, and notably, histological applications. Other possible applications relate for example to the characterization of materials.

BACKGROUND

The histological study of tissues taken by biopsy are of great use in clinical practice, for example for diagnosing tumors. However, this technique is time-consuming and complex to implement, since it requires a biopsy, i.e. the surgical collection of a sample of the tissue, to be analyzed by an anatomical pathologist. The biopsy implies an invasive act and, in some cases, an invasive surgery as in the case of brain tumor biopsy. Therefore, non-intrusive imaging techniques, such as optical imaging, have been developed to view the internal structure of the biological tissues or more generally of semi-transparent objects. In order to examine suspicious lesions and obtain valuable pathognomonic information, these imaging techniques have to give access in situ to a depth of the order of a millimeter below the surface of the tissue and exhibit a resolution of the order of a micrometer. The speed of execution, the simplicity of the act and the cost are also important parameters to be taken into account.

Several techniques have been developed in this context, such as optical coherence tomography (OCT), full field OCT, confocal microscopy. However, these techniques have major drawbacks such as, respectively, poor spatial resolution, provision of images parallel to the surface of the observed object, insufficient depth of penetration of the scanning.

Different solutions to improve spatial resolution and allow in-depth scanning of tissues are proposed by several authors. For instance, U.S. Pat. No. 6,485,413B1, US2009147373A1 and US2009133170A1 all disclose apparatuses for forward directed optical scanning comprising dynamic focusing systems. However, no solution is proposed to reduce the optical dispersion in these apparatuses.

WO2007017589A1 discloses a device for optical imaging comprising an interferometer, wherein the light dispersion between the two arms of the interferometer is reduced by introducing a compensation medium. However, this patent application does not disclose any technical solution for the containment of said compensation liquid during dynamic focusing.

Furthermore, FR3015659A1 discloses an optical tomography apparatus for viewing the internal structure of semi-transparent objects, such as biological tissues, which makes it possible to obtain vertical sections (orthogonal to the surface of the object) at a high rate thanks to a dynamic focusing system, with a high spatial resolution and a satisfactory depth of penetration, thanks to the use of a compensation medium to reduce light dispersion.

The optical apparatus disclosed in FR3015659A1 comprises a polychromatic light source; a one-dimensional optical sensor; an interferometric microscope; an actuation system configured to displace elements of the optical apparatus so as to perform in-depth scan of the tissue; a processor programmed or configured to reconstruct a two-dimensional image from the in-depth scan. In one embodiment, the interferometric microscope of FR3015659A1 includes a first arm, called reference arm, which comprises a first objective and at the end of which is arranged a so-called reference mirror, said reference mirror being arranged to correspond with a focusing plane of the first objective; a second arm, called object arm, which comprises a second objective; a beam splitter coupling said first and second arms to said polychromatic light source and to said sensor; a one-dimensional confocal spatial filtering system, cooperating with said polychromatic light source to illuminate an object to be observed, arranged at the end of the object arm, along a line, called observation line, lying in a focusing plane of the second objective placed in the object arm, said one-dimensional confocal spatial filtering system being also arranged to select the light backscattered by the object and originating from said observation line, and to form a one-dimensional image of said line on said sensor.

In FR3015659A1, the actuation system is configured to displace said observation line parallel to an optical axis of the second objective placed in the object arm so as to perform a one-way scan of said object, while maintaining a zero optical path difference. To do so, the actuation system comprises a plurality of translation stages which can displace synchronously the first and second objectives, without modifying the optical lengths of the interferometer arms, or which can displace the whole interferometer microscope. As mentioned above, FR3015659A1 discloses a configuration of the interferometric microscope comprising an immersion medium to compensate the dispersion difference between the two arms of the interferometer.

However, no solution is proposed to ensure the local containment of the immersion medium, necessary to reduce light dispersion, during dynamic focusing.

Moreover, the overall dimensions and weight of the optical tomography apparatus should be further reduced in order to improve the compacity of the optical apparatus and make it suitable to be hand-held by a physician.

The present invention aims to improve the compacity and reduce the weight of an optical tomography apparatus, so that it can be part of a compact and portable hand-held probe for clinical applications.

SUMMARY

To this end, according to a first aspect, the present invention relates to a dynamic focusing system for an optical device for the observation of an object, the dynamic focusing system comprising:
- an objective housing comprising a circumferential housing part and a light-transmitting window,
- a chamber filled with an immersion medium having a refractive index substantially equal to the refractive index of the object to be observed,
- a movable immersed objective configured to move relative to the objective housing in at least one direction so as to vary the focusing depth and being at least partially immersed in the immersion medium, wherein the immersion medium is confined in the chamber by a deformable sealing member attached to the movable immersed objective and to the objective housing,
wherein the deformable sealing member is configured to ensure that the volume of the chamber remains substantially constant upon displacement of the movable immersed objective relative to the objective housing.

In particular, the movable immersed objective is configured to move relative to the objective housing along at least one direction transverse to the object to be observed, i.e. along at least one direction towards and/or away from the object to be observed. In the case of an elongated movable immersed objective, the movable immersed objective is advantageously configured to move along at least its longitudinal direction relative to the objective housing.

The use of an immersion medium having a refractive index substantially equal to the refractive index of the observed object advantageously allows to reduce the optical dispersion, so that images are obtained with a better resolution. Moreover, the presence of a chamber filled with an immersion medium, in particular an immersion liquid, makes it possible to displace the movable immersed objective along at least one direction transverse to the observed object, in particular along its longitudinal direction, so as to vary the focusing depth of the dynamic focusing system, and at the same time keep the movable immersed objective at least partially immersed in the immersion medium. The configuration of the deformable sealing member has the advantage that, independently from the orientation in space of the dynamic focusing system, the distal portion of the movable immersed objective is continuously immersed in the immersion medium. The structure of the chamber comprising a deformable sealing member that hermetically seals the immersion medium in the chamber also ensures a local containment of the immersion medium, necessary to reduce light dispersion, during dynamic focusing.

The attachment of the deformable sealing member to the movable immersed objective and to the objective housing may involve any attachment means known in the art, e.g. a bonding agent such as glue, complementary fastening means such as male-female snap-fitting elements, etc.

According to one embodiment, the deformable sealing member is in the form of a flexible bellow attached between the movable immersed objective and the objective housing.

According to one embodiment, the deformable sealing member has an internal diameter mechanically attached to an external diameter of the movable immersed objective and at least a portion of the external diameter kept in place by a mechanical stop of the objective housing.

According to one embodiment, the objective housing further comprises an external housing part mechanically fixed to the circumferential housing part.

According to one embodiment, the deformable sealing member is configured to enclose a fixed volume of the chamber and has a predefined hardness such that the deformation of the deformable sealing member allows a displacement of the movable immersed objective along a direction transverse to the observed object.

According to one embodiment, the hardness of at least an active part of the deformable sealing member, which is deformed upon displacement of the movable immersed objective relative to the objective housing, is between 40 and 80 Shore A. According to one embodiment, the hardness of the deformable sealing member is between 40 and 80 Shore A.

According to one embodiment, the deformable sealing member comprises an elastomeric material. According to one embodiment, the deformable sealing member is made of an elastomeric material.

According to one embodiment, the thickness of an active part of the deformable sealing member, which is deformed upon displacement of the movable immersed objective relative to the objective housing, is between 0.2 mm and 2 mm.

According to one embodiment, the objective housing further comprises an imaging device arranged in an opening of the circumferential housing part, the imaging device comprising an optical lens placed in the vicinity of the light-transmitting window.

According to one embodiment, the objective housing comprises a lighting device.

According to a second aspect, the present invention relates to a portable apparatus for optical imaging, comprising a dynamic focusing system as described above. Within the meaning of the invention, a portable apparatus is an apparatus which can be hand-held and used in any direction in space.

According to one embodiment, the portable apparatus further comprises a light source, an optical sensor and an interferometric microscope, the dynamic focusing system being included in one interferometer arm of the interferometric microscope among the reference arm and the object arm.

According to one embodiment, the reference arm ensures a fixed reference arm optical path, and the interferometric microscope comprises:
 a beam splitter coupling the reference arm and the object arm with the light source and the optical sensor, the beam splitter being movable along an optical axis extending along the object arm,
 an actuation system configured to displace the beam splitter and the movable immersed objective along an optical axis extending along the object arm, while maintaining the distance between the beam splitter and the movable immersed objective substantially constant so as to maintain a zero difference between the optical path of the reference arm and the optical path of the object arm.

In an advantageous manner, in a portable apparatus according to the invention, thanks to the use of an immersion medium having a refractive index substantially equal to the refractive index of the object to be observed, only the beam splitter and the movable immersed objective need to be displaced. Then, in a portable apparatus according to the invention, only one translation stage is required in the actuation system, which makes it possible to reduce the overall dimensions and weight of the optical apparatus. The reduction of the weight of the optical elements to be displaced by means of the actuation system has the further advantage of allowing a faster oscillation movement of the beam splitter and the movable immersed objective, making it possible to acquire images at a higher frequency and/or to improve the image sampling and therefore the image quality.

According to one embodiment, the interferometric microscope is a Linnik interferometer microscope comprising a reference objective and a reference mirror in the reference arm, the reference mirror being arranged in a focusing plane of the reference objective, the reference mirror and the reference objective being immersed in an immersion medium enclosed in a reference housing.

According to one embodiment, the interferometric microscope is a Michelson interferometer microscope or a Mirau interferometer microscope.

According to one embodiment, the optical sensor is a one-dimensional optical sensor.

According to one embodiment, the portable apparatus comprises a one-dimensional confocal spatial filtering system, comprising:
 a source collimator, a cylindrical optical element and a spectral filter arranged along the illumination arm comprised between the light source and the beam splitter;

a focusing optics (such as a spherical lens, doublet, objective, etc.) arranged in front of the optical sensor along the acquisition arm, comprised between the beam splitter and the optical sensor.

According to one embodiment, the light source is a polychromatic supercontinuum laser, and the light of the light source is transmitted to the interferometric microscope through an optical fiber.

According to one embodiment, the portable apparatus is used to obtain at least one image of an in-depth section of the skin layers of a subject. The portable apparatus advantageously provides in-depth images of skin layers of a subject with a non-invasive imaging technique, which only requires a contact between the light transmitting window of the portable apparatus and the epidermis of the subject.

According to one embodiment, the portable apparatus is used for ex-vivo imaging, in particular to obtain at least one image of an in-depth section of biological tissues in order to perform biopsy control.

According to one embodiment, the portable apparatus is used for in-vivo imaging, in particular to obtain at least one image of an in-depth section of the skin of a subject for dermatological diagnosis, or of tissues of a subject during a surgical procedure in order to perform margin assessment and guide the surgeon through the procedure (e.g. image-guided surgery).

Definitions

In the present invention, the following terms have the following meanings:

As used herein the singular forms "a", "an", and "the" include plural reference unless the context clearly dictates otherwise.

"Interferometer" refers to an optical device that separates a beam of light into two ray beams, usually by means of reflection and refraction, and that brings the rays together to produce interference. Typically, an interferometer splits into two separate beams one input beam with any type of beam splitter (e.g. a partially transmissive mirror), possibly exposes some of these beams to some external influences (e.g. some length changes or refractive index changes in a transparent medium), and recombines the beams on a beam splitter. The power or the spatial shape of the resulting beam can then be used for example for a measurement.

"Circumferential housing (part)" refers to a housing surrounding at least partially an objective.

BRIEF DESCRIPTION OF THE DRAWINGS

Features and advantages of the invention will become apparent from the following description of embodiments of a dynamic focusing system and a portable apparatus according to the invention, this description being given merely by way of example and with reference to the appended drawings in which.

DETAILED DESCRIPTION

The following detailed description will be better understood when read in conjunction with the drawings. For the purpose of illustrating, the device is shown in the preferred embodiments. It should be understood, however that the application is not limited to the precise arrangements, structures, features, embodiments, and aspects shown. The drawings are not drawn to scale and are not intended to limit the scope of the claims to the embodiments depicted. Accordingly, it should be understood that where features mentioned in the appended claims are followed by reference signs, such signs are included solely for the purpose of enhancing the intelligibility of the claims and are in no way limiting on the scope of the claims.

The present invention relates to a dynamic focusing system and a portable apparatus in which the dynamic focusing system is integrated. For a better understanding of the invention, the dynamic focusing system will be described first.

Figure 1:
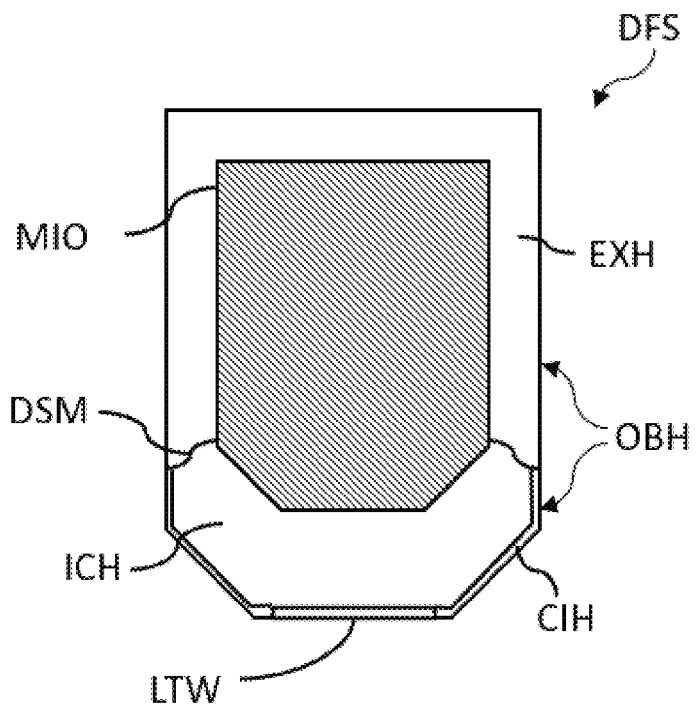
FIG. 1 is a schematic diagram of a dynamic focusing system according to an embodiment of the invention configured to be associated with a Linnik interferometer microscope.
Figure 2:
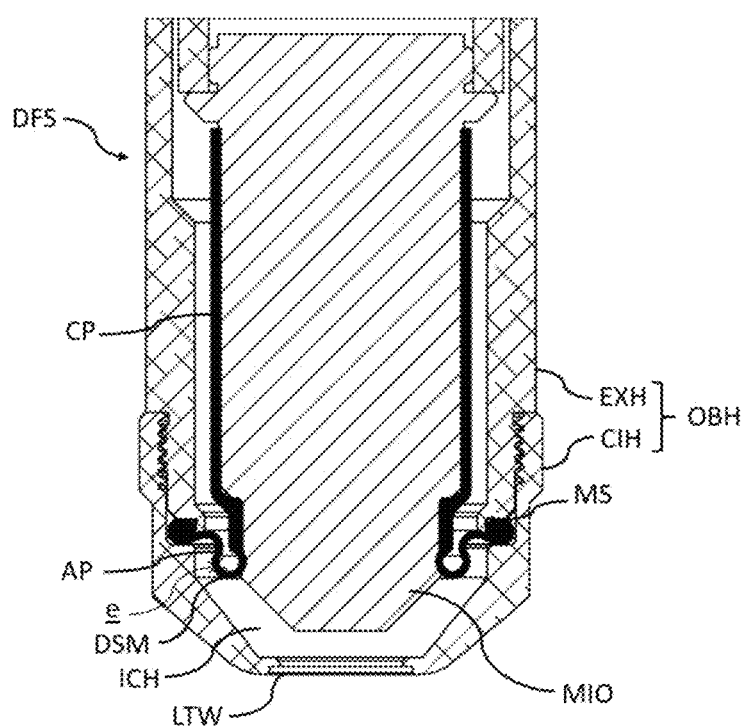
FIG. 2 is a longitudinal cross-section of a dynamic focusing system corresponding to the schematic diagram of FIG. 1.

A dynamic focusing system for an optical device according to one embodiment of the present invention, configured to be associated with a Linnik interferometer microscope, is represented in FIGS. 1 and 2. FIG. 2 is a cross-section of a dynamic focusing system DFS corresponding to the schematic diagram of FIG. 1.

As shown in FIGS. 1 and 2, the dynamic focusing system DFS comprises an objective housing OBH, a chamber ICH filled with an immersion medium, a movable immersed objective MIO and a deformable sealing member DSM. In this embodiment, the objective housing OBH comprises a circumferential housing part CIH and a light-transmitting window LTW. The objective housing OBH further comprises an external housing part EXH mechanically fixed to the circumferential housing part CIH. One advantage of having an objective housing OBH comprising two parts CIH and EXH is that the objective housing OBH can be mechanically assembled by means of a simple circular junction, for example with a fastener such as a clip.

In this embodiment, as visible in FIG. 2, the circumferential housing part CIH and the external housing part EXH have a cylindrical shape so as to house the movable immersed objective MIO. An end portion of the circumferential housing part CIH is coupled to a light-transmitting window LTW. For example, the end portion of the circumferential housing part CIH has a truncated cone shape, where the smaller radius base comprises the light-transmitting window LTW.

The light-transmitting window LTW is advantageously made of a material at least partially transparent, such as for example glass, silica, quartz, or the like. The light-transmitting window LTW may have a cylindrical shape with a height between 0.1 mm and 3 mm and a diameter between 0.1 cm and 3 cm.

A shown in FIGS. 1 and 2, the chamber ICH is delimited by the circumferential housing part CIH of the objective housing OBH, the movable immersed objective MIO and the deformable sealing member DSM, the immersion medium being confined in the chamber ICH. The chamber ICH is sealed with the deformable sealing member DSM, which ensures a sealing junction between the movable immersed objective MIO and the objective housing OBH.

Figure 3:
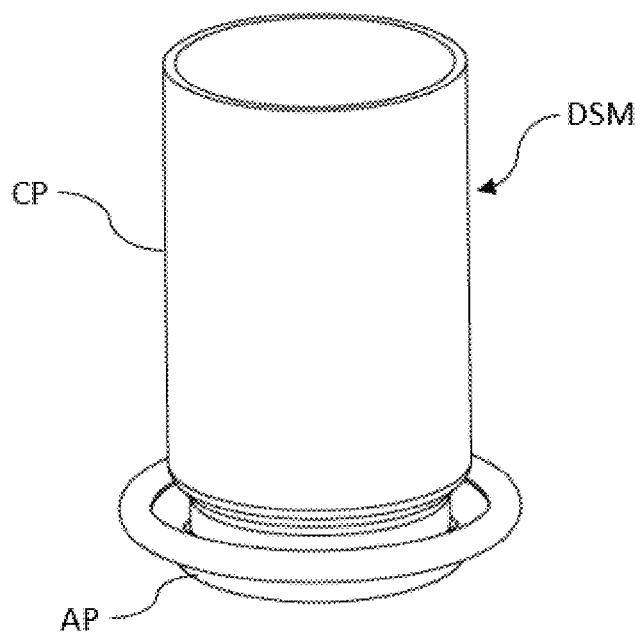
FIG. 3 is a perspective view of the deformable sealing member of the dynamic focusing system of FIG. 2.
Figure 4:
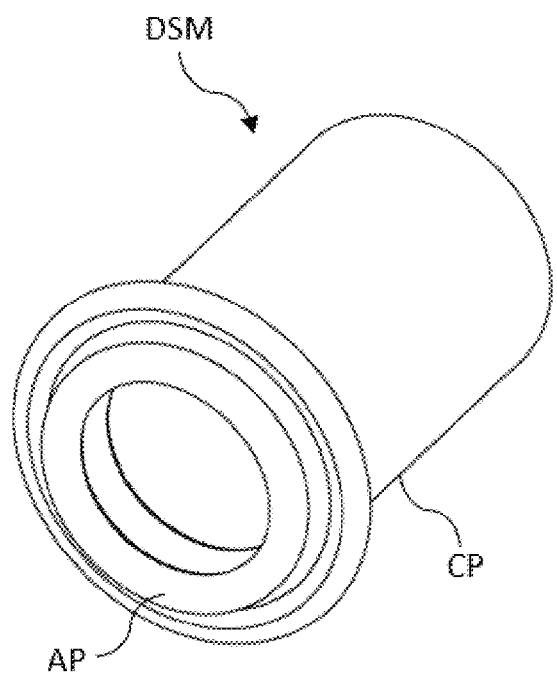
FIG. 4 is a perspective view from another angle of the deformable sealing member of the dynamic focusing system of FIG. 2.

In the embodiment shown in FIGS. 2 to 4, the deformable sealing member DSM comprises a cylindrical part CP and, at a distal end of the cylindrical part CP, an active part AP in the form of a flexible bellow. In this example, as visible in FIG. 2, the cross-section of the active part AP of the deformable sealing member DSM is substantially in the shape of an "S". The active part AP of the deformable sealing member DSM is configured to be deformed upon displacement of the movable immersed objective MIO relative to the objective housing OBH.

The deformable sealing member DSM has an internal diameter (or internal surface) oriented toward the movable immersed objective MIO and the chamber ICH, and an external diameter (or external surface) oriented on the opposite side from the movable immersed objective MIO and the chamber ICH.

The internal diameter of the deformable sealing member DSM is fixed to an external diameter (or external surface) of the movable immersed objective MIO, and at least a portion of the external diameter of the deformable sealing member DSM is fixed to the objective housing OBH. In this way, the deformable sealing member DSM ensures a circular or elliptic sealing junction between the movable immersed objective MIO and the objective housing OBH.

In the example shown in FIG. 2, the external diameter of the deformable sealing member DSM is mechanically kept in place with respect to the objective housing OBH by compression of the deformable sealing member DSM in a mechanical stop MS formed by the cooperation of the circumferential housing part CIH and the external housing part EXH of the objective housing OBH. In particular, this compression at the mechanical stop MS of the objective housing OBH is advantageously exerted when the circumferential housing part CIH and the external housing part EXH are mechanically coupled.

According to one embodiment, the immersion medium is a gel, a transparent solid, a liquid, or air.

According to one embodiment, the movable immersed objective MIO comprises an assembly of magnifying optics with, on a distal portion, an output glass slice. According to one embodiment, the movable immersed objective MIO has a working distance (i.e. a distance between the distal portion of the movable immersed objective MIO and its focal plane) of between 1 mm and 100 mm, in particular of between 1 mm and 40 mm.

The movable immersed objective MIO is configured to move along one direction which, in the illustrated example, is the longitudinal direction of the movable immersed objective MIO, which is a direction transverse to a median plane of the light-transmitting window LTW and to an object OBJ to be observed. The movable immersed objective MIO is configured to move within the volume defined by the internal surface of the objective housing OBH. The initial distance between the movable immersed objective MIO and the light-transmitting window LTW, before the movable immersed objective MIO is longitudinally displaced relative to the objective housing OBH, corresponds to the working distance of said movable immersed objective MIO, i.e. the movable immersed objective MIO is focused on the outer face of the light-transmitting window LTW in the initial configuration, before a longitudinal displacement of the movable immersed objective MIO is operated.

A movement along the longitudinal direction of the movable immersed objective MIO relative to the objective housing OBH modifies the distance between the movable immersed objective MIO and the light-transmitting window LTW. Upon movement of the movable immersed objective MIO along the longitudinal direction, the deformable sealing member DSM changes its configuration according to the positioning of the movable immersed objective MIO. More specifically, upon movement of the movable immersed objective MIO in the longitudinal direction, the active part AP of the deformable sealing member DSM is deformed so as to keep the volume of the chamber ICH substantially constant. In one embodiment, the longitudinal direction of the movable immersed objective MIO is a direction perpendicular to the median plane of the light-transmitting window LTW.

In one embodiment, at least a portion of the movable immersed objective MIO is fully immersed in said immersion medium. In one embodiment, the immersed portion of the movable immersed objective MIO is the distal portion of the movable immersed objective MIO, the distal portion being the portion closest to the light-transmitting window LTW.

The deformable sealing member DSM, and in particular its deformable active part AP, is configured to keep the volume of the chamber ICH substantially constant when there is a longitudinal displacement of the movable immersed objective MIO relative to the objective housing OBH in the longitudinal direction. The configuration of the deformable sealing member DSM has the advantage that, independently from the orientation in space of the dynamic focusing system DFS, the distal portion of the movable immersed objective MIO is continuously fully immersed in the immersion medium.

The deformable sealing member DSM is designed with a stiffness allowing a displacement of the movable immersed objective MIO relative to the objective housing OBH, in the longitudinal direction, over a predefined range of distances from the light-transmitting window LTW, such as for example over a distance range of from 0 mm to 2 mm from the light-transmitting window LTW, while still enclosing the same fixed volume of the chamber ICH.

In a preferred embodiment, the deformable sealing member DSM is configured to have a stiffness as low as possible, so as to reduce as much as possible the resistance to deformation of the deformable sealing member DSM when the movable immersed objective MIO is displaced in the longitudinal direction relative to the objective housing OBH. Such low stiffness promotes a smooth and rapid displacement of the movable immersed objective MIO inside the objective housing OBH.

The stiffness of the deformable sealing member DSM is determined by a combination of parameters, including physico-chemical properties of the constitutive material(s) of the deformable sealing member DSM, in particular the elastic modulus and the hardness of the constitutive material(s), and geometric properties of the deformable sealing member DSM, in particular the thickness and the shape of the deformable sealing member DSM.

In an advantageous embodiment, the hardness of at least the active part AP of the deformable sealing member DSM is between 40 and 80 Shore A. Advantageously, the Young's modulus of at least the active part AP of the deformable sealing member DSM is selected so as to allow displacements of the movable immersed objective MIO over the above-mentioned predefined range of distances in the longitudinal direction of the movable immersed objective MIO, for example the Young's modulus of the constitutive material of at least the active part AP of the deformable sealing member DSM is between 800 MPa and 2000 MPa.

In an advantageous embodiment, the deformable sealing member DSM, or at least its active part AP, is made of a material selected from mineral elastomers or synthetic elastomers. Preferably, the deformable sealing member DSM, or at least its active part AP, comprises or is made of an elastomeric material, in particular an elastomeric material selected from: silicone, such as for example elastomeric silicone MQ (Methyl-Silicone), VMQ (Vinyl-Methyl-Silicone), PVMQ (Phenyl-Vinyl-Methyl-Silicone); polyisoprene; polybutadiene; polyisobutylene; polyacrylonitrile; polyethylene; polypropylene; polyurethane; polyamide; polysulfide; and their copolymers.

In an advantageous embodiment, the thickness e of at least the active part AP of the deformable sealing member DSM is between 0.2 mm and 2 mm, preferably between 0.2 mm and 0.8 mm.

Figure 5:
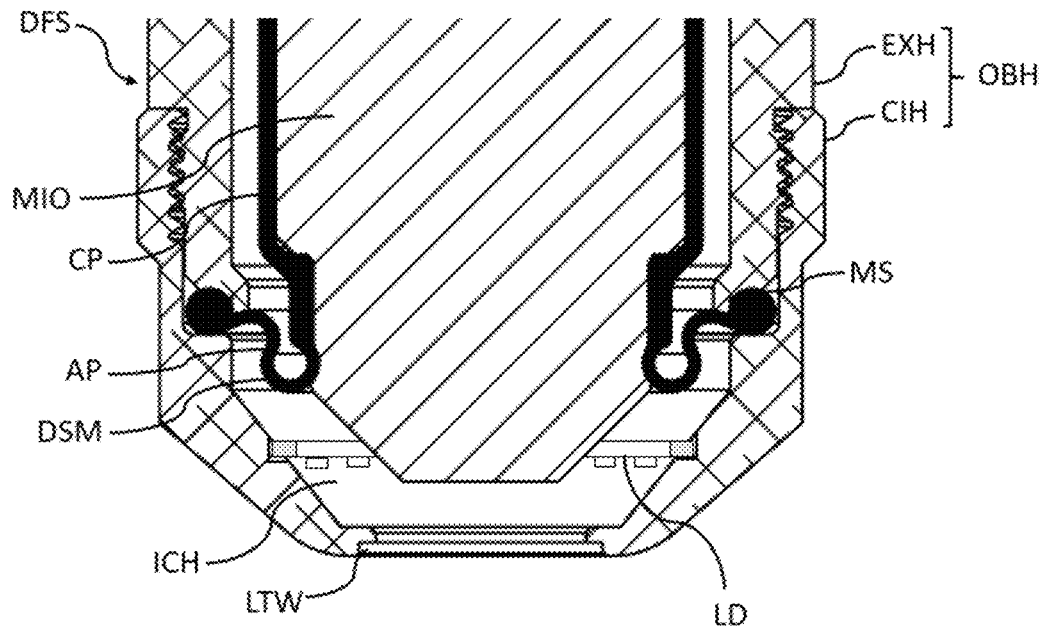
FIG. 5 is a partial longitudinal cross-section of a dynamic focusing system according to an embodiment of the invention similar to that of FIG. 2, further comprising a lighting device.
Figure 6:
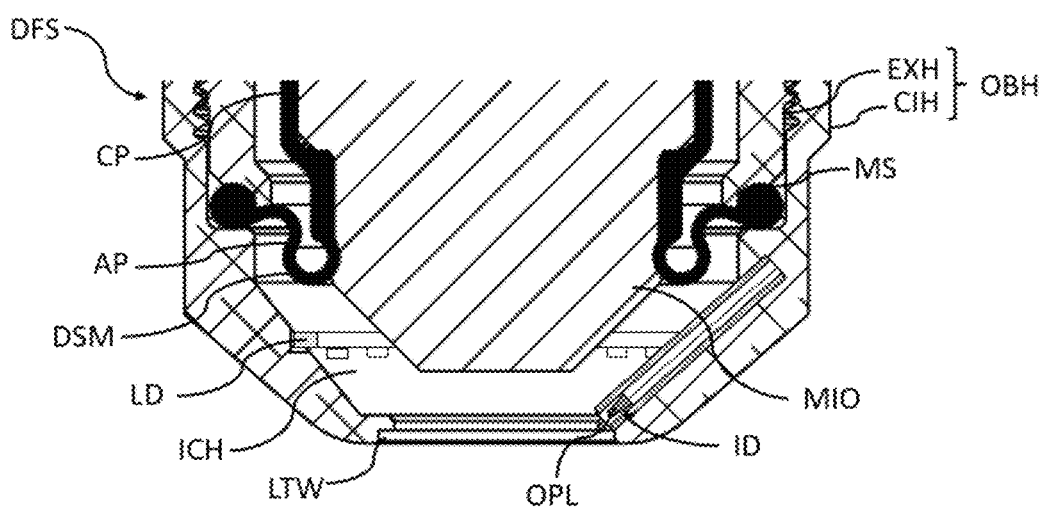
FIG. 6 is a partial longitudinal cross-section of a dynamic focusing system according to an embodiment of the invention similar to that of FIG. 2, further comprising a lighting device and an imaging device.

In the embodiments represented in FIGS. 5 and 6, the objective housing OBH of the dynamic focusing system DFS further comprises a lighting device LD. Said lighting device LD may be for example a single light-emitting diode, known as a LED, or a ring of multiple LEDs surrounding the light-transmitting window LTW. In the embodiments illustrated in FIGS. 5 and 6, the lighting device LD is placed inside the chamber ICH. One advantage is that the objective housing OBH is configured to support the lighting device LD.

In the embodiment represented in FIG. 6, the objective housing OBH further comprises an imaging device ID, arranged in an opening of the circumferential housing part CIH. The imaging device ID may be, for example, a low-power miniaturized image sensor such as, but without being limited to, a complementary metal oxide semiconductor, known as CMOS, charge-coupled device, known as CCD, and the like. In one embodiment, the imaging device ID comprises an optical lens OPL placed in the vicinity of the light-transmitting window LTW in order to focus the image on the imaging sensor of the imaging device ID.

Yet another aspect of the present invention relates to a portable apparatus for performing optical imaging. Other possible applications relate for example to the non-destructive characterization of materials. In one embodiment, the portable apparatus comprises a dynamic focusing system DFS as described hereabove, a light source LS and an optical sensor OS.

Figure 7:
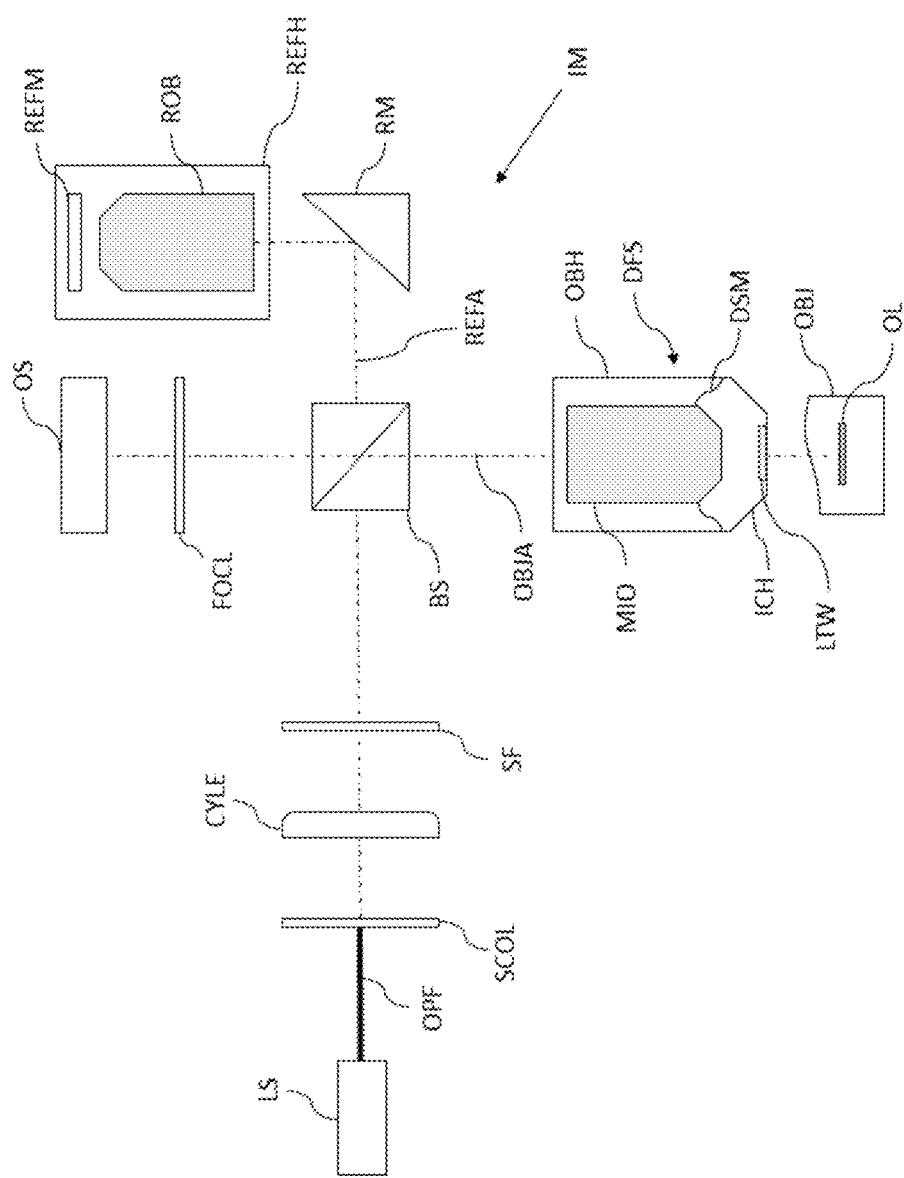
FIG. 7 is a schematic diagram of a portable apparatus according to an embodiment of the invention comprising the dynamic focusing system of FIG. 1 and a Linnik interferometer microscope.
Figure 8:
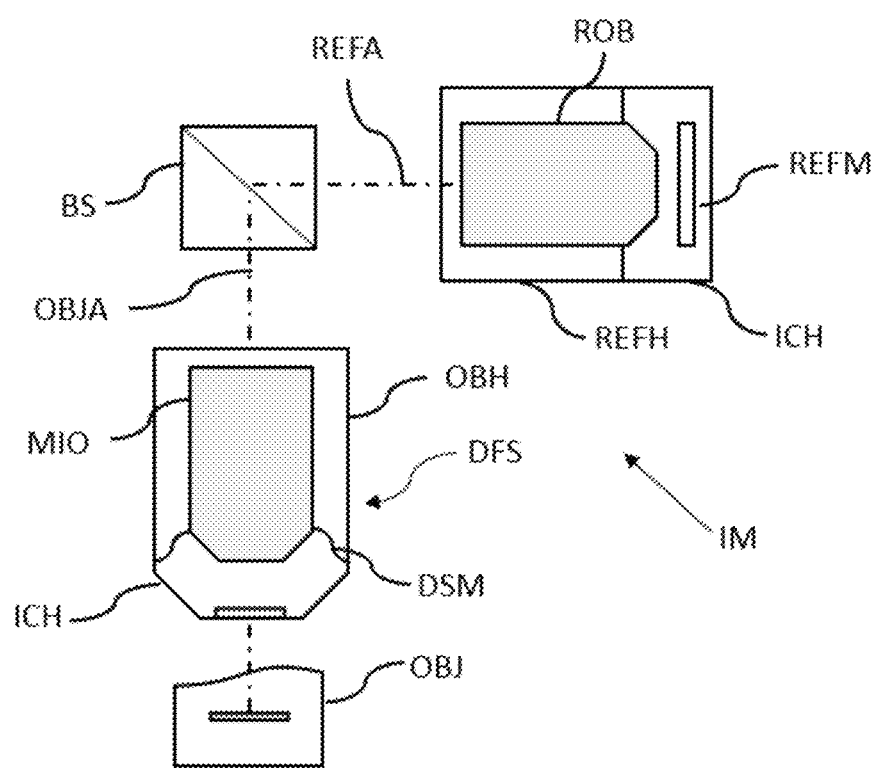
FIG. 8 is a schematic diagram of a part of a portable apparatus according to another embodiment of the invention comprising the dynamic focusing system of FIG. 1 and a Linnik interferometer microscope.

In the embodiments shown in FIGS. 7 and 8, the portable apparatus is an optical tomographic apparatus further comprising an interferometric microscope IM, the dynamic focusing system DFS being comprised in the object arm OBJA. More precisely, as shown in FIG. 7, the portable apparatus comprises a Linnik interferometer microscope IM, spatial filtering means SCOL, CYLE, SF, an optical sensor OS and the dynamic focusing system DFS of FIG. 1.

In one embodiment, the light source LS comprised in the portable apparatus is a polychromatic light source. The light source LS is preferably a source of high luminance, such as a light-emitting diode or an association of light-emitting diodes, a superluminescent diode or an association of superluminescent diodes, a halogen filament lamp, an arc lamp. In a preferred embodiment, the light source LS is a laser or laser-based source, such as a polychromatic supercontinuum laser.

In all cases, the spectral width (at mid-height) of the light source LS is preferably greater than or equal to 100 nm. The greater this spectral width, the better the axial resolution of the portable apparatus. The center wavelength of the light source LS may be in the visible-light wavelength range or in the near infrared wavelength range. In biological and medical applications, preference is generally given to the near infrared, typically between 600 nm and 1500 nm. The light source LS can be polarized or non-polarized, spatially coherent or incoherent. Spatially coherent light sources (of laser or superluminescent diode types) may be advantageous because of their greater luminance and a more efficient confocal gating, but they can introduce coherence "noise", i.e. spurious interference phenomena leading to a reduction of the relative amplitude of the useful interferometric signal and a lack of uniformity of lighting. However, these problems are strongly reduced by the use of a one-dimensional confocal spatial filtering.

According to one embodiment, the optical sensor OS is a one-dimensional optical sensor. According to this embodiment, the one-dimensional optical sensor (e.g. linear camera), has a single row of pixels (square or rectangular), or a few (typically not more than 10 or 20, and at most 100) rows of pixels which detect the incident light. The linear optical sensor may consist of photosensors such as photodiodes, charge-coupled devices (CDD), silicon photomultipliers, CMOS, and the like.

The light generated by the light source LS is injected into an input end of an optical fiber OPF, and exits from the opposite output end of said optical fiber. According to one embodiment, the optical fiber OPF is a monomode optical fiber and is a glass optical fiber comprising at least one material in the following non-limiting list: silica, fluorozirconate, fluoroaluminate, chalcogenide glasses, as well as crystalline materials such as sapphire and the like.

In one embodiment, the portable apparatus further comprises a one-dimensional confocal spatial filtering system, cooperating with the light source LS to illuminate an object OBJ to be observed along an observation line OL, so as to form a one-dimensional image of said observation line OL on the one-dimensional optical sensor OS. As shown schematically in FIG. 7, the one-dimensional confocal spatial filtering system is arranged in both the illumination arm, between the light source LS and the beam splitter BS, and the acquisition arm, by use of a one-dimensional optical sensor OS. Said one-dimensional confocal spatial filtering system comprises a source collimator SCOL, a cylindrical optical element CYLE, and a spectral filter SF, arranged in the illumination arm. Said one-dimensional confocal spatial filtering system also comprises a focusing optics FOCL arranged in front of the one-dimensional optical sensor OS in the acquisition arm.

In the embodiment of FIG. 7, the illumination beam at the output of the optical fiber OPF is collimated by the source collimator SCOL. Said source collimator SCOL may be a lens or a mirror, which allows to focus the light source beam to infinity. The cylindrical optical element CYLE may be a cylindrical mirror or a cylindrical lens. Said cylindrical optical element CYLE may be a convergent or divergent cylindrical lens, mirror, or assembly of lenses or mirrors, and shapes the illumination beam in order to illuminate the object OBJ along an observation line OL having a width of the order of a micrometer (more specifically, the width of the observation line OL is of the order of magnitude of the lateral resolution of the imaging system). The spectral filter SF has the function of removing undesired wavelengths from the light source spectrum.

As shown in FIG. 7, the one-dimensional illuminating beam formed by the cylindrical optical element CYLE is directed to the beam splitter BS, which may be for example a splitter cube. The beam splitter BS directs a first portion of the incident beam along a first arm of the interferometric microscope IM, called "reference arm", REFA, and a second portion of the incident beam along a second arm of the interferometric microscope IM, called "object arm", OBJA. In the embodiment shown in FIG. 7, a reference microscope objective ROB and a so-called "reference" mirror REFM are arranged in the reference arm REFA. In one embodiment, the reference microscope objective ROB and reference mirror REFM are enclosed in a reference housing and immersed in an immersion medium.

The reference objective ROB focuses the light on the reference mirror REFM, then collects the light reflected thereby and directs it, in the reverse direction, along the reference arm REFA. In the embodiment shown in FIG. 7, the dynamic focusing system DFS, having a movable immersed objective MIO identical to the reference objective ROB, is arranged in the object arm OBJA. The movable immersed objective MIO focuses the light on the object OBJ to be observed, then collects the light backscattered thereby and directs it, in the reverse direction, along the object arm OBJA. Typically, the two objectives may have a numerical aperture in a range between 0.1 and 1.0 (contrary to traditional scanning OCT, here there is no field depth constraint which would limit the numerical aperture to be employed).

According to one embodiment, the immersion medium is the same in the reference objective ROB and the dynamic focusing system DFS, in order to introduce no dispersion mismatch between the two interferometer arms. According to one embodiment, the immersion medium has a refractive index substantially equal to that of the object to be observed. According to one embodiment, the material of the reference mirror REFM is chosen to have a reflection coefficient close to that of the object OBJ to be observed. According to one example, the portable apparatus is an optical tomography apparatus used to analyze skin tissues of a subject, and the refractive index of the immersion liquid is approximately of 1.4, which is a value close to the average refractive index of the skin.

In the embodiment where the dynamic focusing system DFS is part of an optical tomography apparatus used to analyze skin tissues of a subject, the material of the light-transmitting window LTW of the dynamic focusing system DFS advantageously has a refractive index close to that of skin (i.e. refractive index of in vivo skin of approximately 1.4). In a preferred embodiment, the light-transmitting window LTW is a glass slice having a refractive index equal to 1.45. This choice of material has the advantage of reducing the reflection at the interface between the light-transmitting window LTW and the skin, and therefore loss of photons backscattered from the skin through the movable immersed objective MIO. According to this embodiment, the reference mirror REFM is a glass slice which, as mentioned before, has a reflection coefficient close to that of skin. According to one embodiment, the thickness of the reference mirror REFM is in a range between 10 µm and 5 mm, preferably between 10 µm and 1 mm, preferably between 200 µm and 700 µm.

In one embodiment, the portable apparatus comprises at least one reflecting mirror RM. In particular, the reference arm REFA may comprise a reflecting mirror RM. The portable apparatus may comprise one or multiple reflecting mirrors RM to deviate the beam between the beam splitter BS and the optical sensor OS so as to "fold" the optical path of the beam in order to improve the compacity of the portable apparatus.

In one embodiment, the beam splitter BS is movable along an optical axis extending along the object arm OBJA. In one embodiment, the portable apparatus further comprises an actuation system configured to displace the beam splitter BS and the movable immersed objective MIO along an optical axis extending along the object arm OBJA, while maintaining the distance between the beam splitter BS and the movable immersed objective MIO substantially constant so as to maintain a zero difference between the optical path of the reference arm REFA and the optical path of the object arm OBJA. This configuration is made possible by the selection of a refractive index for the immersion medium substantially equal to the refractive index of the object to be observed, as described above. The actuation system allows to displace the observation line OL parallel to an optical axis of the movable immersed objective MIO placed in the object arm OBJA so as to perform a one-way scan of said object OBJ. In one embodiment, the actuation system comprises one translation stage mounted on a piezoelectric motor. According to an alternative embodiment, the translation stage is mounted on a voice coil actuator or brushless motor.

In one embodiment, the piezoelectric motor is configured to oscillate a mass of between 0.1 g and 350 g at a frequency ranging from 1 Hz to 20 Hz (sawtooth wave—duty cycle 20%) with an amplitude ranging from 10 µm to 750 µm, which allows to reach a frame rate comprised between 1 and 20 LC-OCT images/sec. In one embodiment, the actuation system is controlled by a processor. The advantage of this embodiment is that the displacement of the beam splitter BS and the movable immersed objective MIO requires only one translation stage and therefore allows to reduce the overall dimensions, weight and cost of the portable apparatus. This is in contrast with more conventional systems in which typically, in order to keep a zero optical path difference, in addition to the displacement of the objective in the object arm OBJA, a displacement of the reference mirror and reference objective assembly, or even of all the components of the interferometer all together, is also required. Furthermore, displacing only the beam splitter BS and the movable immersed objective MIO, instead of the whole interferometer, reduces the overall weight to be displaced, which improves the motor performances in terms of speed, linearity, frequency, etc. It is thus possible to obtain higher speed of image acquisition, to improve image quality thanks to the higher linearity with which the movable immersed objective MIO is displaced, and to reach higher sampling frequency thanks to the higher oscillation frequency available.

In an alternative embodiment, the actuation system may comprise a plurality of translation stages. In this embodiment, the reference mirror REFM and reference objective ROB assembly may be displaced axially by means of a first translation stage of said actuation system, whereas the movable immersed objective MIO may be displaced by means of a respective second translation stage, also forming part of said actuation system, in order to keep a zero optical path difference between the two interferometer arms.

As a variant, it is possible to vary the axial distance between the object OBJ and the interferometric microscope IM, while keeping the different elements of the interferometric microscope stationary (or in a fixed position relative to one another). To this end, it is possible to displace all the interferometric microscope (displacement system not represented) or the object OBJ by means of a translation stage.

According to one embodiment, all components of the portable apparatus are mounted on adjustable stages that are tunable upon calibration of the portable apparatus.

In all cases, this has the effect of modifying the depth to which the object OBJ is probed. An observation line OL, situated in the focal plane (more generally, in the focusing plane) of the movable immersed objective MIO, produces a scan of said object "depth-wise", that is to say in the direction of the optical axis of said movable immersed objective MIO. This scan modifies the thickness of the object OBJ passed through by the light propagating along the object arm OBJA, and therefore the dispersion that it undergoes.

According to one embodiment, the interferometric microscope further comprises a lateral scanning system to be used to scan lines horizontally.

The optical sensor OS acquires line images corresponding to a plurality of different positions of the line imaged in the object OBJ. This stack of line images can be processed digitally to obtain an image of a vertical section of the object OBJ.

In one embodiment, the so-called phase-shift interferometry method is used, in which a number of phase-shifted line images are digitally combined. In one embodiment, one image is produced by a combination of four linear images corresponding to positions of the observation line spaced apart by $\lambda/8n$ in the axial direction, $\lambda$ being the central wavelength of the illuminating light in the object, n being the refractive index of immersion medium. This embodiment corresponds to a phase shift of $\pi/2$ between two adjacent images. If $E_1$, $E_2$, $E_3$, $E_4$ are used to denote these images, $(E_1-E_3)^2+(E_2-E_4)^2$ corresponds to the amplitude of the interference signal and $(E_1-E_3)/(E_2-E_4)$ corresponds to the phase of the interference signal. This phase can provide information other than structural and tomographic information on the object. It is essential to note that there is no contradiction between the concept of phase offset, or phase shift, and the fact, mentioned above, that the observation line always corresponds to an optical path difference between the object and reference arms that is equal to zero. There is indeed a phase offset between the contributions of this structure to the images acquired in succession during the axial scan.

As a variant, the stack of line images can be processed by Fourier analysis in order to extract the envelope of the interference fringes (the amplitude of the interference signal) and eliminate the non-modulated part of the signal (non-interferometric signal).

It should be stressed that, in accordance with the invention, the one-way scan of the object OBJ over all the depth imaged in order to produce an image in axial cross section also makes it possible to acquire, at the same time, an interferometric signal (obviously, a second one-way scan can then be performed in the opposite direction).

A three-dimensional image of the object OBJ can be obtained by juxtaposing adjacent section images. This requires a scan in a direction at right angles both to the acquisition line and to the optical axis of the movable immersed objective MIO. This scan can be obtained by using the lateral scanning system or, alternatively, by displacing the object OBJ (or, in an equivalent manner, the interferometric microscope IM, or the illumination line) by means of a lateral translation stage.

FIG. 8 illustrates another embodiment of the invention in which the interferometric microscope IM is of the Linnik interferometer type. The dynamic focusing system DFS in the object arm OBJA, as well as the reference objective ROB and the reference mirror REFM in the reference arm REFA, are immersed in a silicone oil immersion medium. The polychromatic light source LS is spatially coherent. It comprises a primary polychromatic source, which comprises in particular a spatially coherent supercontinuum laser and a monomode glass optical fiber OPF. The use of a supercontinuum laser presents the following advantages: broadband spectrum to provide a micrometer-level axial resolution, spatially coherent to allow proper focusing of light on biological tissue and then high-depth penetration and sufficient power-output to generate real-time image, which is an interesting feature for example in acquisition of skin images in vivo.

The spatial coherence of the illumination makes it possible to produce a particularly simple confocal filtering that does not require any slit and that comprises just one cylindrical mirror CYLE divergent on the side of the light source (in fact, of the output end of the optical fiber) and a focusing optics FOCL arranged in front of the optical sensor OS, of one-dimensional type. The cylindrical mirror CYLE creates an astigmatism by making the light beam divergent in the plane of the figure but not in a perpendicular plane. The result thereof is an illumination of the object OBJ and of the reference mirror REFM in the form of an oriented line; the focusing optics FOCL creates an image of this line on the one-dimensional optical sensor; the light not originating from the observation line reaches the single line of pixels of the optical sensor OS with an attenuated intensity, thus producing a one-dimensional confocal filtering. The axial scan is performed by displacing with the actuation system the beam splitter BS and the movable immersed objective MIO.

Figure 9:
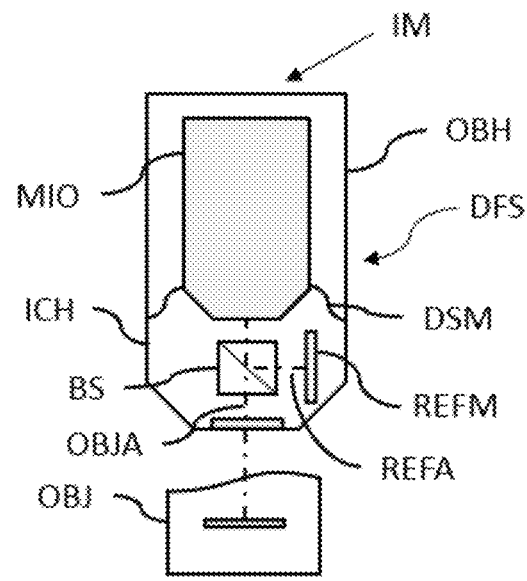
FIG. 9 is a schematic diagram similar to FIG. 1 for a dynamic focusing system according to an embodiment of the invention corresponding to a Michelson interferometer microscope.
Figure 10:
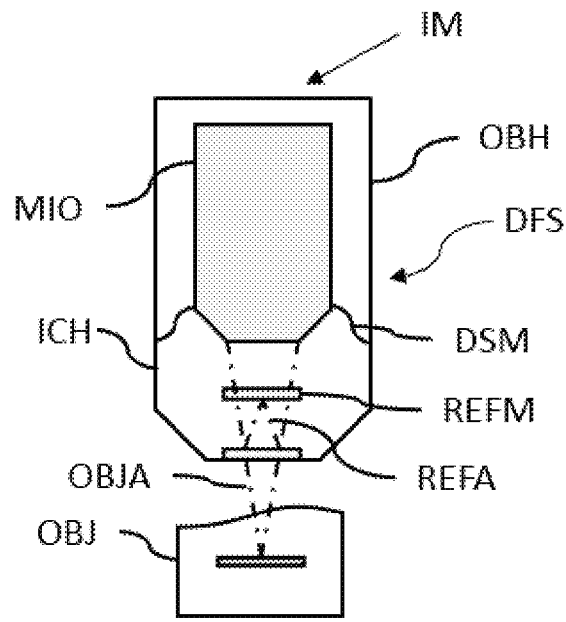
FIG. 10 is a schematic diagram similar to FIG. 1 for a dynamic focusing system according to an embodiment of the invention corresponding to a Mirau interferometer microscope.

In other embodiments, as illustrated for example in FIGS. 9 and 10, the interferometric microscope IM may be a Michelson interferometer microscope or a Mirau interferometer microscope. A Michelson interferometer microscope or Mirau interferometer microscope comprises a single objective. As shown in the embodiments of FIGS. 9 and 10, the dynamic focusing system DFS and portable apparatus according to the invention comprise a single movable immersed objective MIO, with a reference mirror REFM and a beam splitter BS secured to said movable immersed objective MIO and aligned along its optical axis. These setups are simpler and more compact than those comprising a Linnik interferometer microscope, but the relative displacements of the elements of the interferometers are more difficult to implement.

Figure 11:
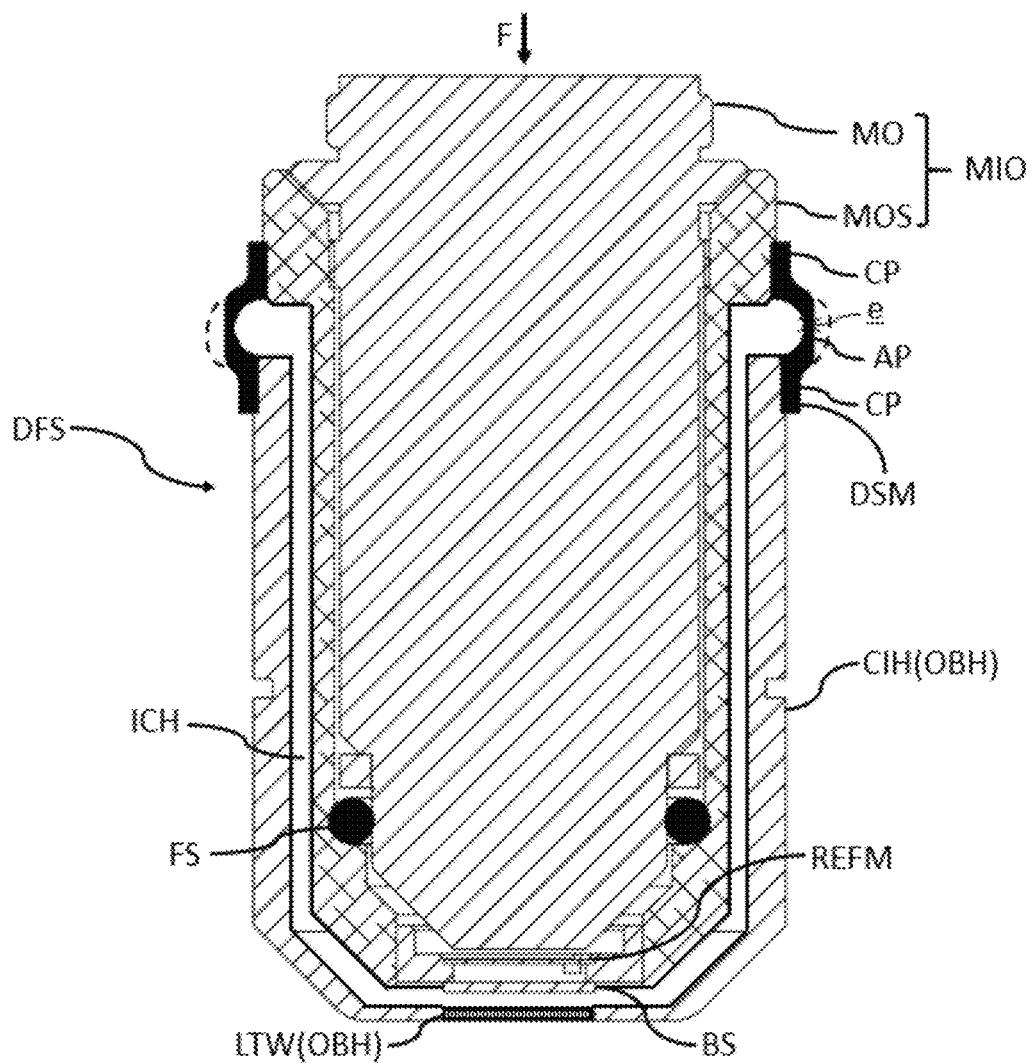
FIG. 11 is a longitudinal cross-section of a dynamic focusing system corresponding to the schematic diagram of FIG. 10.

FIG. 11 is a longitudinal cross-section of a dynamic focusing system DFS according to an embodiment of the invention with a Mirau interferometer microscope, corresponding to the schematic diagram of FIG. 10. As visible in FIG. 11, the objective housing OBH comprises a circumferential housing part CIH and a light-transmitting window LTW. In this embodiment, the movable immersed objective MIO comprises an objective MO and, tightly attached to it, an objective support MOS. As shown in FIG. 11, the objective support MOS comprises a beam splitter BS aligned, along the optical axis, with the light-transmitting window LTW of the objective housing OBH. The objective support MOS further comprises a reference mirror REFM, aligned along the optical axis, between the output glass slice of the objective MO and the beam splitter BS. In this configuration, the reference arm REFA and the object arm OBJA are aligned along the optical axis of the movable immersed objective MIO, as shown in the schematic diagram of FIG. 10.

In FIG. 11, the space delimited between the objective MO and the objective support MOS is sealed by a fixed seal FS having a toroidal shape, such as an O-ring, and is filled with an immersion medium. In this embodiment, the chamber ICH filled with an immersion medium having a refractive index substantially equal to the refractive index of the object OBJ to be observed is delimited by the objective housing OBH, the movable immersed objective MIO and a deformable sealing member DSM. The deformable sealing member DSM ensures a sealing junction between the movable immersed objective MIO and the objective housing OBH, so as to confine the immersion medium in the chamber ICH. The immersion medium in the chamber ICH and the immersion medium in the space delimited between the objective MO and the objective support MOS may have the same refractive index.

As visible in FIG. 11, in this embodiment, the movable immersed objective MIO is not completely enclosed in the objective housing OBH. The deformable sealing member DSM has a tubular shape comprising two cylindrical end parts CP, i.e. a distal cylindrical part CP whose internal surface is connected to an external surface of the circumferential housing part CIH, and a proximal cylindrical part CP whose internal surface is connected to an external surface of a portion of the movable immersed objective MIO which is not enclosed by the circumferential housing part CIH. The deformable sealing member DSM also comprises, between the two cylindrical end parts CP, a deformable active part AP of reduced thickness e, which is configured to be deformed upon displacement of the movable immersed objective MIO relative to the objective housing OBH, so as to keep the volume of the chamber ICH substantially constant.

In particular, upon displacement of the movable immersed objective MIO relative to the objective housing OBH in the direction of the arrow F of FIG. 11, the active part AP of the deformable sealing member DSM is deformed as shown by the dotted lines of FIG. 11. This deformation allows to compensate for the volume modification induced by the displacement of the movable immersed objective MIO toward the light-transmitting window LTW so as to ensure that the total volume of the chamber ICH remains substantially constant.

In the embodiment of FIG. 11, in the same way as in the embodiment of FIG. 2, the deformable sealing member DSM is designed with a stiffness allowing a displacement of the movable immersed objective MIO relative to the objective housing OBH, in the longitudinal direction, over a predefined range of distances from the light-transmitting window LTW, such as for example over a distance range of from 0 mm to 2 mm from the light-transmitting window LTW, while still enclosing the same fixed volume of the chamber ICH. The deformable sealing member DSM is also configured to have a stiffness as low as possible, so as to reduce as much as possible the resistance to deformation of the deformable sealing member DSM when the movable immersed objective MIO is displaced in the longitudinal direction relative to the objective housing OBH.

In particular, in advantageous embodiments, the hardness of at least the active part AP of the deformable sealing member DSM is between 40 and 80 Shore A; the Young's modulus of at least the active part AP of the deformable sealing member DSM is between 800 MPa and 2000 MPa; the deformable sealing member DSM, or at least its active part AP, comprises or is made of an elastomeric material, in particular an elastomeric material selected from: silicone, such as for example elastomeric silicone MQ (Methyl-Silicone), VMQ (Vinyl-Methyl-Silicone), PVMQ (Phenyl-Vinyl-Methyl-Silicone); polyisoprene; polybutadiene; polyisobutylene; polyacrylonitrile; polyethylene; polypropylene; polyurethane; polyamide; polysulfide; and their copolymers; the thickness e of at least the active part AP of the deformable sealing member DSM is between 0.2 mm and 2 mm, preferably between 0.2 mm and 0.8 mm.

A portable apparatus according to the present invention may be used, in particular, in the context of onco-dermatology. In this context, the object imaged by the portable apparatus is a vertical section of the skin layers of a subject, for example in correspondence of a nevus. Further fields of application of the present invention are in-vivo and ex-vivo imaging, dermo-cosmetics, biopsy control on biological tissues, margin assessment in surgery guidance, etc. According to one embodiment, when the portable apparatus is used in onco-dermatology, the lighting device LD may be used in conjunction with the imaging device ID to take photos or videos that may be visualized in real time on a user interface, thus allowing e.g. a physician to easily target the area of the skin of a subject to be imaged with the portable apparatus.

While various embodiments have been described and illustrated, the detailed description is not to be construed as being limited hereto. Various modifications can be made to the embodiments by those skilled in the art without departing from the true spirit and scope of the disclosure as defined by the claims.

The invention claimed is:

1. A dynamic focusing system for an optical device for the observation of an object, the dynamic focusing system comprising:
    an objective housing comprising a circumferential housing part and a light-transmitting window,
    a chamber filled with an immersion medium having a refractive index substantially equal to the refractive index of the object to be observed,
    a movable immersed objective configured to move relative to the objective housing along at least one direction so as to vary the focusing depth and being at least partially immersed in the immersion medium,
    wherein the immersion medium is confined in the chamber by a deformable sealing member attached to the movable immersed objective and to the objective housing,
    wherein the deformable sealing member is configured to ensure that the volume of the chamber remains substantially constant upon displacement of the movable immersed objective relative to the objective housing.

2. The dynamic focusing system according to claim 1, wherein the deformable sealing member is configured to enclose a fixed volume of the chamber and has a predefined hardness such that the deformation of the deformable sealing member allows a displacement of the movable immersed objective in a direction transverse to the observed object.

3. The dynamic focusing system according to claim 1, wherein the hardness of at least an active part of the deformable sealing member, which is deformed upon displacement of the movable immersed objective relative to the objective housing, is between 40 and 80 Shore A.

4. The dynamic focusing system according to claim 1, wherein the deformable sealing member comprises an elastomeric material.

5. The dynamic focusing system according to claim 1, wherein the thickness of an active part of the deformable sealing member, which is deformed upon displacement of the movable immersed objective relative to the objective housing, is between 0.2 mm and 2 mm.

6. The dynamic focusing system according to claim 1, wherein the objective housing further comprises an imaging device arranged in an opening of the circumferential housing part, the imaging device comprising an optical lens placed in the vicinity of the light-transmitting window.

7. The dynamic focusing system according to claim 1, wherein the objective housing comprises a lighting device.

8. The dynamic focusing system according to claim 1, wherein the objective housing further comprises an external housing part fixed to the circumferential housing part.

9. A portable apparatus for optical imaging, comprising a dynamic focusing system according to claim 1.

10. A portable apparatus for optical imaging according to claim 9, further comprising a light source, an optical sensor, and an interferometric microscope, wherein the dynamic focusing system is comprised in one interferometer arm of the interferometric microscope among the reference arm and the object arm.

11. The portable apparatus according to claim 10, wherein the reference arm ensures a fixed reference arm optical path, the interferometric microscope comprising:
  a beam splitter coupling the reference arm and the object arm with the light source and the optical sensor, said beam splitter being movable along an optical axis extending along the object arm;
  an actuation system configured to displace the beam splitter and the movable immersed objective along an optical axis extending along the object arm, while maintaining the distance between the beam splitter and the movable immersed objective substantially constant so as to maintain a zero difference between the optical path of the reference arm and the optical path of the object arm.

12. The portable apparatus according to claim 10, wherein the interferometric microscope is a Linnik interferometer microscope comprising in the reference arm a reference objective and a reference mirror, the reference mirror being arranged in a focusing plane of the reference objective, the reference mirror and the reference objective being immersed in an immersion medium enclosed in a reference housing.

13. The portable apparatus according to claim 10, wherein the interferometric microscope is a Michelson interferometer microscope.

14. The portable apparatus according to claim 10, wherein the interferometric microscope is a Mirau interferometer microscope.

15. The portable apparatus according to claim 10, wherein the optical sensor is a one-dimensional optical sensor.

16. The portable apparatus according to claim 10, further comprising a one-dimensional confocal spatial filtering system, comprising:
  a source collimator, a cylindrical optical element and a spectral filter arranged along the illumination arm comprised between the light source and the beam splitter;
  a focusing optics arranged in front of the optical sensor along the acquisition arm, comprised between the beam splitter and the optical sensor.

17. The portable apparatus according to claim 16, wherein the focusing optics comprises at least one of a spherical lens, doublet and objective.

18. The portable apparatus according to claim 10, wherein the light source is a polychromatic supercontinuum laser and the light of the light source is transmitted to the interferometric microscope through an optical fiber.

19. The portable apparatus according to claim 10, used to obtain at least one image of an in-depth section of the skin layers of a subject.

20. The portable apparatus according to claim 10, used to obtain at least one image of an in-depth section of biological tissues to perform biopsy control.

21. The portable apparatus according to claim 10, used to obtain at least one image of an in-depth section of biological tissues to perform margin assessment during surgical procedures.

* * * * *